(12) United States Patent
Chinbe et al.

(10) Patent No.: US 9,371,070 B2
(45) Date of Patent: Jun. 21, 2016

(54) SYSTEM TO CONTROL THE TORQUE OF AN INTERNAL COMBUSTION ENGINE DURING A GEAR CHANGE

(71) Applicants: Tomohiro Chinbe, Kariya (JP); Masakazu Owatari, Nagakute (JP); Takaaki Tokura, Nagoya (JP); Masayasu Mizobuchi, Nisshin (JP)

(72) Inventors: Tomohiro Chinbe, Kariya (JP); Masakazu Owatari, Nagakute (JP); Takaaki Tokura, Nagoya (JP); Masayasu Mizobuchi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/400,962

(22) PCT Filed: May 14, 2013

(86) PCT No.: PCT/IB2013/000936
§ 371 (c)(1),
(2) Date: Nov. 13, 2014

(87) PCT Pub. No.: WO2013/171564
PCT Pub. Date: Nov. 21, 2013

(65) Prior Publication Data
US 2015/0120115 A1    Apr. 30, 2015

(30) Foreign Application Priority Data

May 16, 2012   (JP) .................................. 2012-112910

(51) Int. Cl.
*B60W 30/19*    (2012.01)
*B60W 10/06*    (2006.01)
(Continued)

(52) U.S. Cl.
CPC ................ *B60W 30/19* (2013.01); *B60W 10/06* (2013.01); *B60W 10/08* (2013.01); *B60W* (Continued)

(58) Field of Classification Search
None
See application file for complete search history.

(56) References Cited

U.S. PATENT DOCUMENTS

2003/0060328 A1 * 3/2003 Beaty .................... B60W 10/06
 477/109
2008/0156552 A1 * 7/2008 Dickinson ............. F02B 37/004
 60/602

(Continued)

FOREIGN PATENT DOCUMENTS

CN         101663514 A     3/2010
EP         1 413 724 A2    4/2004
(Continued)

*Primary Examiner* — John R Olszewski
*Assistant Examiner* — Jess Whittington
(74) *Attorney, Agent, or Firm* — Oliff PLC (57) ABSTRACT

An electronic control unit executes throttle torque reduction control for decreasing an engine torque by reducing a throttle opening degree during an upshift of an automatic transmission with respect to the throttle opening degree before a start of the upshift. During the upshift of the automatic transmission, the electronic control unit actuates a waste gate valve in a closing direction with respect to a position of the waste gate valve before the start of the upshift in parallel with execution of the throttle torque reduction control. Thus, a decrease in supercharging pressure due to execution of the throttle torque reduction control is suppressed during the upshift, and the engine torque that has been temporarily decreased in an inertia phase of the upshift recovers immediately after the upshift, so it is possible to suppress deterioration of drivability.

8 Claims, 7 Drawing Sheets (51) Int. Cl.
*F02D 41/02* (2006.01)
*B60W 10/08* (2006.01)
*B60W 10/115* (2012.01)
*B60W 20/00* (2016.01)
*F16H 63/50* (2006.01)
*B60K 6/485* (2007.10)

(52) U.S. Cl.
CPC ..... 10/115 (2013.01); *B60W 20/00* (2013.01); *B60W 20/15* (2016.01); *B60W 20/30* (2013.01); *F02D 41/023* (2013.01); *F16H 63/502* (2013.01); *B60K 6/485* (2013.01); *B60W 2710/0605* (2013.01); *B60W 2710/0633* (2013.01); *B60W 2710/0638* (2013.01); *B60W 2710/0666* (2013.01); *B60W 2710/083* (2013.01); *B60Y 2400/435* (2013.01); *F16H 2063/506* (2013.01); *Y02T 10/6226* (2013.01); *Y02T 10/6286* (2013.01); *Y10S 903/93* (2013.01)

(56) References Cited

U.S. PATENT DOCUMENTS

| 2010/0056332 | A1 | 3/2010 | Kobayashi et al. |
| 2011/0296830 | A1* | 12/2011 | Tsukamoto ........... B60W 10/06 477/109 |
| 2014/0283514 | A1* | 9/2014 | Ibuki ....................... F02D 23/02 60/605.2 |

FOREIGN PATENT DOCUMENTS

| EP | 2 202 400 A2 | 6/2010 |
| JP | A-5-86918 | 4/1993 |
| JP | A-10-331650 | 12/1998 |
| JP | A-2000-248953 | 9/2000 |
| JP | A-2004-211551 | 7/2004 |
| JP | A-2005-500944 | 1/2005 |
| JP | A-2010-14050 | 1/2010 |
| JP | A-2010-156225 | 7/2010 |
| WO | WO 03/018974 A1 | 3/2003 |

* cited by examiner

|  | C1 | C2 | B1 | B2 | B3 | F1 |
|---|---|---|---|---|---|---|
| 1st | ○ |  |  | ◎ |  | △ |
| 2nd | ○ |  | ○ |  |  |  |
| 3rd | ○ |  |  |  | ○ |  |
| 4th | ○ | ○ |  |  |  |  |
| 5th |  | ○ |  |  | ○ |  |
| 6th |  | ○ | ○ |  |  |  |
| R |  |  |  | ○ | ○ |  |
| N |  |  |  |  |  |  |

◎ ENGAGED DURING ENGINE BRAKING
△ ENGAGED ONLY DURING DRIVING

SYSTEM TO CONTROL THE TORQUE OF AN INTERNAL COMBUSTION ENGINE DURING A GEAR CHANGE

BACKGROUND OF THE INVENTION

1. Field of the Invention

The invention relates to a technique for improving drivability in a vehicle that includes an engine having a supercharger and an automatic transmission.

2. Description of Related Art

There has been widely known a vehicle driving control system that is used in a vehicle that includes an engine having a supercharger and an automatic transmission. For example, a vehicle control system described in Published Japanese Translation of PCT Application No. 2005-500944 (JP 2005-500944 A) is such a vehicle driving control system. The vehicle driving control system described in JP 2005-500944 A keeps a supercharging pressure while decreasing an engine torque at the time of an upshift of the automatic transmission. Thus, accelerating performance after the upshift is improved.

Incidentally, various controls are known as control for decreasing an engine torque. For example, there are known ignition retardation torque reduction control for decreasing an engine torque by retarding the ignition timing of the engine, throttle torque reduction control for decreasing an engine torque by reducing the opening degree of a throttle valve of the engine, and the like. These controls for decreasing an engine torque are executed in order to reduce a shift time, absorb a shock at an inertia phase and reduce a load of a clutch, and the like, of the automatic transmission, for example, at the time of an upshift of the automatic transmission.

However, in the case where engine torque is decreased at the time of an upshift of the automatic transmission, even when the supercharging pressure is tried to be kept at a target value, it has been assumed, that it may be not possible to appropriately keep the supercharging pressure at the target value due to a difference in method of decreasing an engine toque in torque reduction control, selected at that time. For example, when engine torque is decreased by executing the throttle torque reduction control while execution of the ignition retardation torque reduction control is restricted, it may deteriorate drivability due to a decrease in supercharging pressure.

In addition, it is not clear in JP 2005-500944 A how an engine torque is decreased at the time of an upshift, but, for example, if an engine torque is decreased at the time of the upshift by executing the ignition retardation torque reduction control, the exhaust temperature of exhaust gas from the engine rises due to ignition timing retardation of the engine in the ignition retardation torque reduction control, and the durability of the supercharger may be impaired due to a rise in temperature. On the other hand, it is conceivable that the durability of the supercharger is ensured when the heat-resistant temperature of the supercharger is raised; however, in such a case, a high heat-resistant material is employed for the supercharger, which conceivably leads to an increase in the cost of the supercharger. Such inconveniences are not in public domain.

SUMMARY OF THE INVENTION

The invention provides a vehicle driving control system that, in a vehicle that includes an engine having a supercharger and an automatic transmission, are able to suppress deterioration of drivability due to a decrease in supercharging pressure at the time of an upshift of the automatic transmission and are able to suppress an increase in cost for ensuring the durability of the supercharger against a rise in temperature.

A first aspect of the invention provides a vehicle driving control system that, in a vehicle that includes an engine and an automatic transmission, executes throttle torque reduction control for decreasing an engine torque by reducing an opening degree of a throttle valve during an upshift of the automatic transmission with respect to the throttle opening degree of the throttle valve before a start of the upshift. The engine has a supercharger and a supercharging pressure adjustment device that adjusts a supercharging pressure with a use of the supercharger. The automatic transmission is configured to output power, input from the engine, to a drive wheel. The vehicle driving control system includes a control unit configured to, during the upshift of the automatic transmission, execute the throttle torque reduction control, and actuate the supercharging pressure adjustment device to suppress a decrease in the supercharging pressure.

With this configuration, when the opening degree of the throttle valve (throttle opening degree) is reduced in the throttle torque reduction control, the supercharging pressure is decreased; however, the supercharging pressure adjustment device is actuated in the direction in which a decrease in the supercharging pressure is suppressed in parallel with execution of the throttle torque reduction control, so a decrease in the supercharging pressure due to execution of the throttle torque reduction control is suppressed during the upshift of the automatic transmission, and the engine torque recovers immediately after the upshift, so it is possible to suppress deterioration of drivability due to a decrease in the supercharging pressure at the time of the upshift. Moreover, it is not necessary or it is less necessary to retard the ignition timing of the engine in order to decrease the engine torque during the upshift of the automatic transmission, so it is possible to suppress deterioration of drivability as described above, and it is possible to suppress an increase in cost for ensuring the durability of the supercharger against a rise in temperature.

In the vehicle driving control system according to the above aspect, the control unit may be configured to execute high-response torque reduction control in parallel with the throttle torque reduction control as control for decreasing a transmission input torque input to the automatic transmission during the upshift of the automatic transmission, the high-response torque reduction control has a higher responsiveness than the throttle torque reduction control, and the control unit may be configured to increase an actuation amount of the supercharging pressure adjustment device such that a decrease in the supercharging pressure is suppressed, with an increase in a proportion of a decrease amount of the transmission input torque through the throttle torque reduction control to a total decrease amount of the transmission input torque through the throttle torque reduction control and the high-response torque reduction control. With this configuration, when the high-response torque reduction control is also executed in parallel with the throttle torque reduction control at the time of the upshift of the automatic transmission, it is possible to suppress deterioration of drivability due to a decrease in the supercharging pressure. In addition, it is possible to decrease the transmission input torque at effective time point by executing the high-response torque reduction control.

In the vehicle driving control system according to the above aspect, the high-response torque reduction control may decrease the engine torque by retarding ignition timing of the engine with respect to the ignition timing of the engine before a start of the high-response torque reduction control or may decrease the transmission input torque by causing an electric motor to output a torque opposite to the engine torque, and the electric motor may be coupled to the engine.

With this configuration, it is possible to execute the high-response torque reduction control with the use of an existing device of the vehicle.

In the vehicle driving control system according to the above aspect, in a vehicle state where accelerating operation is conducted by a driver and the engine is driven although the vehicle is stopped, the control unit may be configured to cause the supercharging pressure adjustment device not to be actuated such that a decrease in the supercharging pressure is suppressed. With this configuration, when it is required to protect components, for example, a clutch, included in the automatic transmission that constitutes a power transmission path, it is possible to avoid actuation of the supercharging pressure adjustment device in a direction in which a load of the components is increased.

In the vehicle driving control system according to the above aspect, the supercharger may be an exhaust turbine supercharger that is driven for rotation by exhaust gas of the engine to generate the supercharging pressure, the supercharging pressure adjustment device may be configured to raise the supercharging pressure by increasing the amount of exhaust gas that drives the supercharger for rotation within exhaust gas of the engine, and the control unit may be configured to actuate the supercharging pressure adjustment device such that the amount of exhaust gas that drives the supercharger for rotation is increased with respect to the amount of exhaust gas that drives the supercharger for rotation before the start of the upshift to suppress a decrease in the supercharging pressure. With this configuration, it is possible to sufficiently obtain the advantageous effect that deterioration of drivability due to a decrease in the supercharging pressure at the time of the upshift is suppressed.

In the vehicle driving control system according to the above aspect, in a vehicle state where accelerating operation is conducted by a driver and the engine is driven although the vehicle is stopped, the control unit may be configured to cause the supercharging pressure adjustment device to be actuated such that the supercharging pressure is decreased with respect to the supercharging pressure before the engine torque is decreased. With this configuration, the engine torque is suppressed by the supercharging pressure adjustment device as well, with the result that an overload of the components, for example, a clutch, included in the automatic transmission that constitutes a power transmission path is suppressed, and it is possible to protect the components.

In the vehicle driving control system according to the above aspect, the upshift of the automatic transmission, in which the throttle torque reduction control is executed, may be a power-on upshift.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings.

Figure 1:
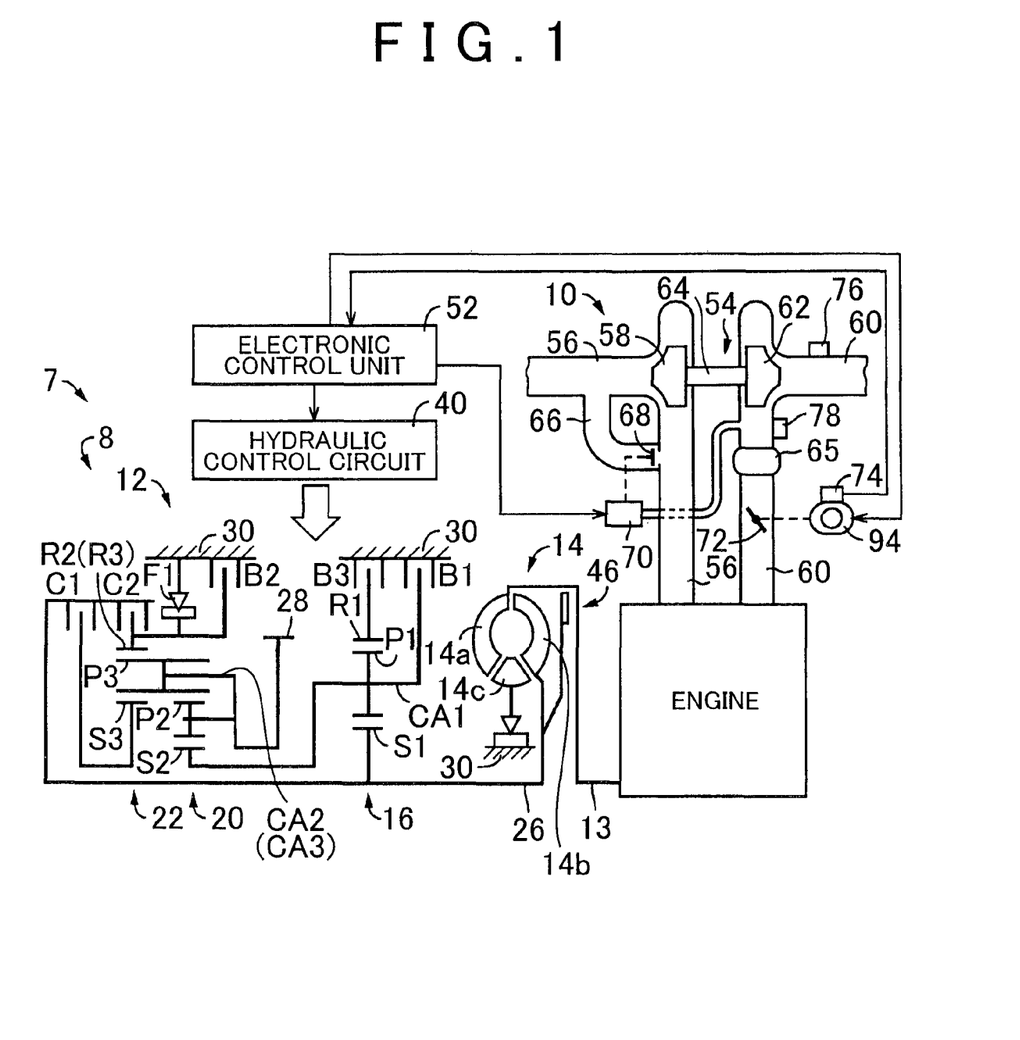
FIG. 1 is a skeletal view for illustrating the configuration of a vehicle driving system provided in a vehicle to which an embodiment of the invention is applied.

FIG. 1 is a skeletal view for illustrating the configuration of a vehicle driving system 7 provided in a vehicle 6 to which the embodiment of the invention is applied. The vehicle 6 includes the vehicle driving system 7, a pair of drive wheels 38, and the like. The vehicle driving system 7 includes a vehicle power transmission device 8 (hereinafter, referred to as "power transmission device 8") and an engine 10. The power transmission device 8 is interposed between the engine 10 and the drive wheels 38. The power transmission device 8 includes an automatic transmission 12 and a torque converter 14. The torque converter 14 is coupled to an output shaft 13 of the engine 10, and is interposed between the engine 10 and the automatic transmission 12. The power transmission device 8 is suitably used in an FF vehicle in which the power transmission device 8 is mounted laterally (transversely) of the vehicle 6 (see FIG. 3).

The automatic transmission 12 constitutes part of a power transmission path from the engine 10 to the drive wheels 38 (see FIG. 3), and outputs power, input from the engine 10, toward the drive wheels 38. That is, the power of the engine 10, input to a transmission input shaft 26, is output from an output gear 28 toward the drive wheels 38. The automatic transmission 12 includes a plurality of planetary gear units 16, 20, 22, a plurality of hydraulic friction engagement devices (clutches C and brakes B), and a one-way clutch F1. The plurality of hydraulic friction engagement devices are specifically five friction engagement devices (a first clutch C1, a second clutch C2, a first brake B1, a second brake B2, a third brake B3). The automatic transmission 12 is a step-gear transmission in which a plurality of speeds (gears) are alternatively established by releasing any one of the plurality of hydraulic friction engagement devices and engaging any one of the plurality of hydraulic friction engagement devices. For example, the automatic transmission 12 shifts speeds in accordance with a preset relationship (shift line map) on the basis of a vehicle state that is indicated by a vehicle speed V and an accelerator operation amount PAP (for example, indicated by %). In short, the automatic transmission 12 is a step-gear transmission that carries out a so-called clutch-to-clutch shift that is often used in an ordinary vehicle. That is, a shift (downshift or upshift) of the automatic transmission 12 progresses as the engage-side engaging device that is the engaging device to be engaged for the shift engages and the release-side engaging device that is the engaging device to be released for the shift releases. Specifically, the first planetary gear unit 16 of the automatic transmission 12 is of a single pinion type, and includes a first sun gear S1, first pinion gears P1, a first carrier CA1 and a first ring gear R1. The second planetary gear unit 20 is of a double pinion type, and includes a second sun gear S2, second pinion gears P2, third pinion gears P3, a second carrier CA2 and a second ring gear R2. The third planetary gear unit 22 is of a single pinion type, and includes a third sun gear S3, third pinion gears P3, a third carrier CA3 and a third ring gear R3. The second planetary gear unit 20 and the third planetary gear unit 22 constitute a Ravigneaux planetary gear train in which the second and third ring gears R2, R3 are formed of a common member and the third pinion gears P3 of the third planetary gear unit 22 also serve as one of sets of pinion gears of the second planetary gear unit 20. As is apparent from FIG. 1, the transmission input shaft 26 that is an input rotating member of the automatic transmission 12 is a turbine shaft of the torque converter 14. The output gear 28 that is an output rotating member of the automatic transmission 12 functions as a differential drive gear that is in mesh with a differential driven gear (large-diameter gear) 34 of a differential gear unit 32 (see FIG. 3). The power of the engine 10 is transmitted to the pair of drive wheels (front wheels) 38 via the torque converter 14, the automatic transmission 12, the differential gear unit 32 and a pair of axles 36 (see FIG. 3). The automatic transmission 12 is formed substantially symmetrical with respect to the center line, and the lower half below the center line is not shown in FIG. 1.

Figure 2:
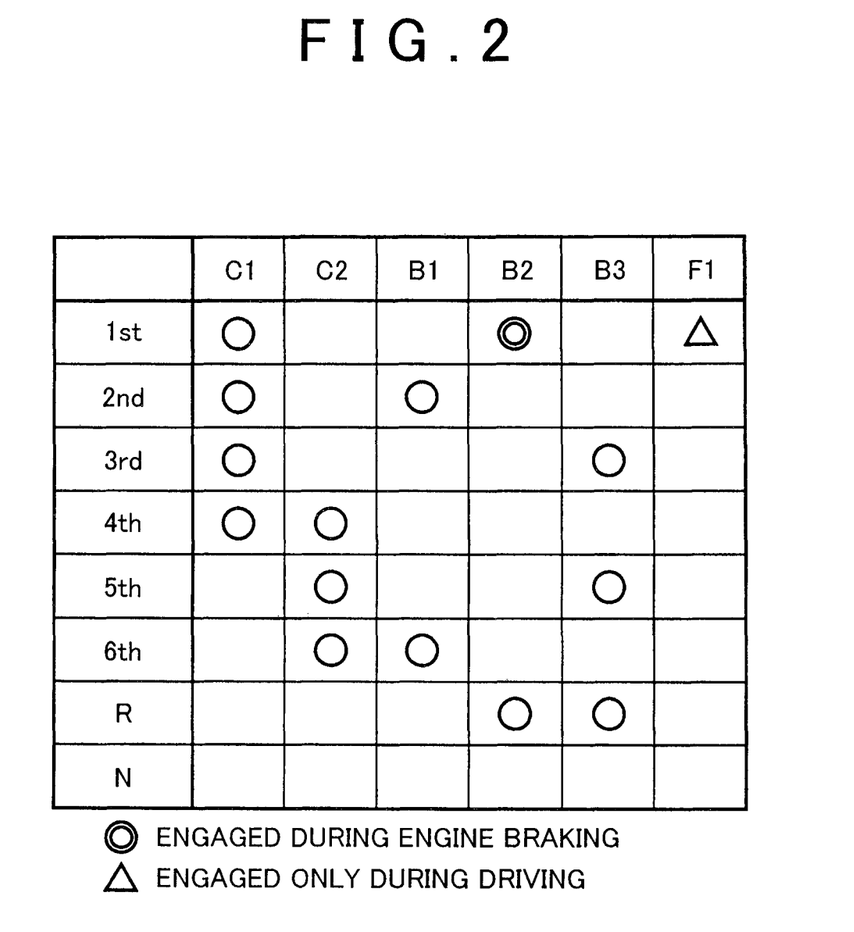
FIG. 2 is an operation table for illustrating operating states of engagement elements when a plurality of speeds (gears) are established in an automatic transmission included in the vehicle driving system shown in FIG. 1.

FIG. 2 is an operation chart for illustrating operating states of engagement elements at the time when a plurality of speeds (gears) are established in the automatic transmission 12. The operation table of FIG. 2 collectively shows the relationship between the speeds and the operating states of the clutches C1, C2 and brakes B1 to B3. The mark "circle" represents "engaged", the mark "double circle" represents "engaged only during engine braking", and the mark "triangle" represents "engaged only during driving". As shown in FIG. 2, in the automatic transmission 12, any one of six forward speeds including the first speed "1st" to the sixth speed "6th" is established or a reverse speed "R" is established on the basis of the operating states of the engagement elements (clutches C1, C2, brakes B1 to B3). The one-way clutch F1 is provided in parallel with the brake B2 for establishing the first speed "1st", so it is not always necessary to engage the brake B2 at the time of a start (acceleration) of the vehicle. A speed ratio γat of the automatic transmission 12 is calculated from the mathematical expression that "Speed ratio γat=Input rotation speed Nin/Output rotation speed Nout" on the basis of the input rotation speed Nin that is the rotation speed Nin of the transmission input shaft 26 and the output rotation speed Nout that is the rotation speed Nout of the output gear 28.

The clutches C1, C2 and brakes B1 to B3 (hereinafter, simply referred to as clutches C, brakes B when not specifically distinguished from each other) are the hydraulic friction engagement devices, such as multi-disc clutches and multi-disc brakes, controlled for engagement by hydraulic actuators. Engaged and released states of the clutches C1, C2 and brakes B1 to B3 are changed through energization, de-energization or current control over linear solenoid valves provided in a hydraulic control circuit 40 (see FIG. 1), and transitional hydraulic pressures, and the like, at the time of engaging and releasing are controlled.

The torque converter 14 includes a pump impeller 14a, a turbine impeller 14b and a stator impeller 14c. The pump impeller 14a is coupled to the output shaft (crankshaft) 13 of the engine 10. The turbine impeller 14b is coupled to the transmission input shaft 26 of the automatic transmission 12. The stator impeller 14c is coupled to a housing (transmission case) 30 of the automatic transmission 12 via a one-way clutch. The torque converter 14 is a fluid transmission device that transmits power, generated by the engine 10, to the automatic transmission 12 via fluid. A lock-up clutch 46 that is a direct coupling clutch is provided between the pump impeller 14a and the turbine impeller 14b, and is set to an engaged state, a slip state or a released state through hydraulic control, or the like. By setting the lock-up clutch 46 to the engaged state, strictly speaking, by setting the lock-up clutch 46 to a completely engaged state, the pump impeller 14a and the turbine impeller 14b integrally rotate.

The engine 10 is not an internal combustion engine that does not include an ignition device, such as a diesel engine, but the engine 10 is an internal combustion engine having an ignition device, such as a gasoline engine. The engine 10 includes a supercharger 54. The supercharger 54 is a known exhaust turbine supercharger that is provided in an intake/exhaust system of the engine 10 and that is driven for rotation by part or all of exhaust gas of the engine 10 to increase the pressure of intake air of the engine 10, that is, a turbocharger that generates a supercharging pressure Pcm with the use of exhaust gas of the engine 10. Specifically, as shown in FIG. 1, the supercharger 54 includes an exhaust turbine wheel 58, an intake compressor wheel 62 and a rotary shaft 64. The exhaust turbine wheel 58 is provided in an exhaust pipe 56 of the engine 10, and is driven for rotation by exhaust gas of the engine 10. The intake compressor wheel 62 is provided in an intake pipe 60 of the engine 10, and compresses intake air of the engine 10 as the intake compressor wheel 62 is rotated by the exhaust turbine wheel 58. The rotary shaft 64 couples the exhaust turbine wheel 58 to the intake compressor wheel 62. When exhaust gas of the engine 10 enough to drive the supercharger 54 is introduced to the exhaust turbine wheel 58, the engine 10 operates in a supercharged state where intake air is supercharged by the supercharger 54. On the other hand, when exhaust gas of the engine 10, which is introduced to the exhaust turbine wheel 58, is not enough to drive the supercharger 54, the supercharger 54 is almost not driven, and the engine 10 operates in a state where supercharging is suppressed as compared to the supercharged state, that is, a normal aspiration state (also referred to as NA state or non-supercharged state) that is a non-supercharged intake state as in the case of a normal aspiration engine having no supercharger 54.

The engine 10 includes an intercooler 65 that cools intake air supercharged by the supercharger 54. The intercooler 65 is arranged between the intake compressor wheel 62 and an electronic throttle valve 72 in an intake passage formed of the intake pipe 60 of the engine 10. Therefore, intake air discharged from the intake compressor wheel 62 flows to the electronic throttle valve 72 via the intercooler 65.

An exhaust bypass passage 66 is arranged in parallel with an exhaust passage in which the exhaust turbine wheel 58 is provided in the exhaust pipe 56. A waste gate valve 68 is provided in the exhaust bypass passage 66, and opens or closes the exhaust bypass passage 66. The waste gate valve 68 is configured such that an opening degree θwg (hereinafter, referred to as waste gate valve opening degree θwg) of the waste gate valve 68 is continuously adjustable. An electronic control unit 52 continuously opens or closes the waste gate valve 68 using a pressure in the intake pipe 60 by controlling an electric actuator 70. As the waste gate valve opening degree θwg increases, exhaust gas of the engine 10 is easily emitted through the exhaust bypass passage 66. Therefore, when exhaust gas from an exhaust port of the engine 10 is obtained to such a degree that it is possible to set the engine 10 to the supercharged state, a downstream-side atmospheric pressure PLin of the intake compressor wheel 62 in the intake pipe 60, in short, the supercharging pressure Pcm (PLin) generated by the supercharger 54, which is an outlet pressure of the intake compressor wheel 62, decreases as the waste gate valve opening degree θwg increases. That is, the waste gate valve 68 functions as a supercharging pressure adjustment device that adjusts the supercharging pressure Pcm by adjusting the amount of exhaust gas for driving the supercharger 54 for rotation, specifically, the amount of exhaust gas that is supplied to the exhaust turbine wheel 58 of the supercharger 54, within exhaust gas of the engine 10. For example, the waste gate valve 68 is able to increase or reduce the amount of exhaust gas for driving the supercharger 54 for rotation through its opening degree θwg. The waste gate valve 68 raises the supercharging pressure Pcm by increasing the amount of exhaust gas for driving the supercharger 54 for rotation; whereas the waste gate valve 68 decreases the supercharging pressure Pcm by reducing the amount of exhaust gas for driving the supercharger 54 for rotation.

The engine 10 includes the electronic throttle valve 72. The electronic throttle valve 72 is a valve mechanism that adjusts an intake air flow rate Qin (for example, indicated by g/sec) of the engine 10, and is opened or closed by an electric throttle actuator 94. Specifically, As a throttle opening degree θth that is the opening degree of the electronic throttle valve 72 reduces, in other words, as the electronic throttle valve 72 is closed (throttled), the intake air flow rate Qin of the engine 10 reduces. The electronic throttle valve 72 is arranged downstream of the supercharger 54 in the intake passage formed by the intake pipe 60 of the engine 10. Specifically, the electronic throttle valve 72 is arranged downstream of the intake compressor wheel 62 of the supercharger 54.

Figure 3:
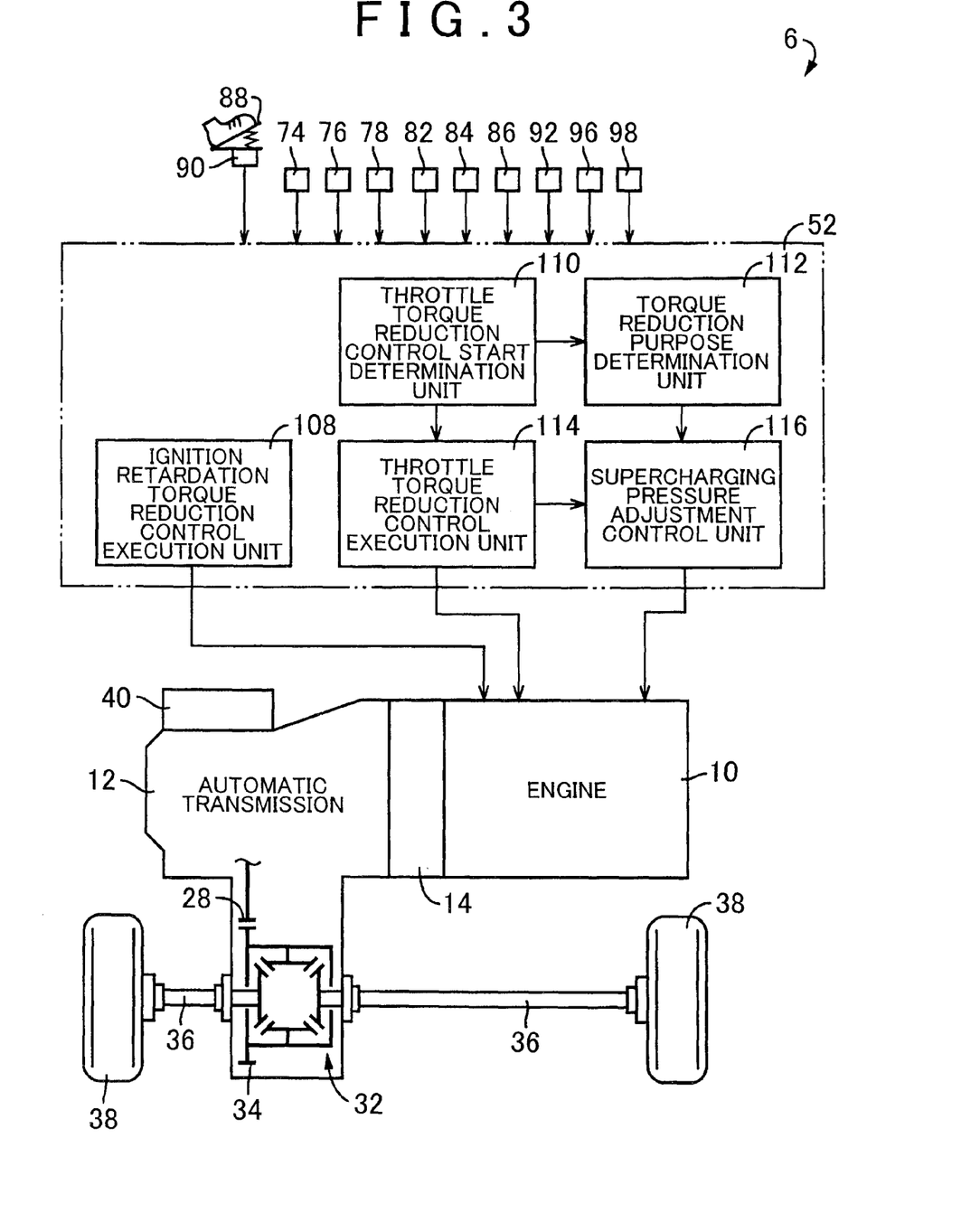
FIG. 3 is a view that illustrates signals that are input to an electronic control unit for controlling the vehicle driving system shown in FIG. 1 and a functional block diagram for illustrating a relevant portion of control functions provided in the electronic control unit.

FIG. 3 is a view that illustrates signals that are input to a control device of the vehicle driving system 7, that is, the electronic control unit 52 that includes functions as the vehicle driving control system, and is a functional block diagram for illustrating a relevant portion of control functions provided in the electronic control unit 52. The electronic control unit 52 is formed to include a so-called microcomputer, and executes vehicle control associated with, for example, the engine 10 and the automatic transmission 12 by executing signal processing in accordance with prestored programs.

A signal indicating the opening degree θth of the electronic throttle valve 72, that is, the throttle opening degree θth, a signal indicating an upstream-side atmospheric pressure PHin of the intake compressor wheel 62 in the intake pipe 60, a signal indicating the downstream-side atmospheric pressure PLin (=supercharging pressure Pcm) of the intake compressor wheel 62 in the intake pipe 60, a signal indicating the waste gate valve opening degree θwg, a signal indicating an engine rotation speed Ne, a signal indicating the rotation speed Nout of the output gear 28, a signal indicating an accelerator operation amount PAP (also referred to as accelerator pedal operation amount) that is the depression amount of an accelerator pedal 88, corresponding to a driver's required power, a signal indicating the rotation speed Nt of the turbine impeller 14b (hereinafter, referred to as "turbine rotation speed Nt"), that is, the rotation speed Nin (=Nt) of the transmission input shaft 26, a signal indicating a wheel speed Nwh that is detected by a wheel speed sensor 96, a signal indicating the intake air flow rate Qin of the engine 10 (hereinafter, referred to as engine intake air flow rate Qin), and the like, are input from sensors, switches and the like, shown in FIG. 3 to the electronic control unit 52. The throttle opening degree θth is detected by a throttle opening degree sensor 74. The upstream-side atmospheric pressure PHin is detected by a first intake sensor 76. The downstream-side atmospheric pressure PLin is detected by a second intake sensor (supercharging pressure sensor) 78. The waste gate valve opening degree θwg is detected by a waste gate valve opening degree sensor 82. The engine rotation speed Ne is detected by an engine rotation speed sensor 84. The rotation speed Nout of the output gear 28 is detected by an output rotation speed sensor 86. The accelerator operation amount PAP is detected by the accelerator operation amount sensor 90. The turbine rotation speed Nt is detected by a turbine rotation speed sensor 92. The wheel speed Nwh is detected by the wheel speed sensor 96. The engine intake air flow rate Qin is detected by an intake air flow rate sensor 98. A vehicle speed V corresponds to each of the rotation speed Nout of the output gear 28 and the wheel speed Nwh, so the output rotation speed sensor 86 or the wheel speed sensor 96 functions as a vehicle speed sensor. The compressor upstream-side atmospheric pressure PHin is the same as an atmospheric pressure Pair around the vehicle 6, so the first intake sensor 76 also functions as an atmospheric sensor that detects the atmospheric pressure Pair.

In addition, various output signals are supplied from the electronic control unit 52 to the devices provided in the vehicle 6. For example, the electronic control unit 52 increases the throttle opening degree θth as the accelerator operation amount PAP increases on the basis of the accelerator operation amount PAP that is sequentially detected from an empirically set relationship such that an engine torque Te along with a driver's intention is obtained in a normal vehicle travel.

Incidentally, the electronic control unit 52 basically executes ignition retardation torque reduction control and accessorily executes throttle torque reduction control where necessary as control for temporarily decreasing a transmission input torque Tatin that is input to the automatic transmission 12, specifically, the torque Tatin that is applied to the transmission input shaft 26, during an upshift of the automatic transmission 12. The ignition retardation torque reduction control is engine torque control for decreasing the engine torque Te by retarding the ignition timing of the engine 10 with respect to the ignition timing before a start of the control, for example, before a start of the upshift. The throttle torque reduction control is engine torque control for decreasing the engine torque Te by reducing the throttle opening degree θth with respect to the throttle opening degree θth before a start of the control, for example, before a start of the upshift. In addition, the ignition retardation torque reduction control provides a higher responsiveness of the transmission input torque Tatin to a control instruction (command signal) that is output from the electronic control unit 52 for decreasing the engine torque Te as compared to the throttle torque reduction control. The ignition retardation torque reduction control corresponds to high-response torque reduction control according to the invention.

As described above, the electronic control unit 52 executes the ignition retardation torque reduction control as control for temporarily decreasing the transmission input torque Tatin during an upshift of the automatic transmission 12, and, where necessary, executes the throttle torque reduction control as well. Because the engine 10 is a supercharging engine, the electronic control unit 52 executes control for actively adjusting the supercharging pressure Pcm while executing the throttle torque reduction control. A relevant portion of the control function will be described with reference to FIG. 3. As shown in FIG. 1, the output shaft 13 of the engine 10 is coupled to the transmission input shaft 26 via the torque converter 14, so the transmission input torque Tatin corresponds to the engine torque Te, and decreasing the engine torque Te means decreasing the transmission input torque Tatin. In addition, the ignition retardation torque reduction control and the throttle torque reduction control each are executed during an upshift of the automatic transmission 12, and each may be executed in another situation.

As shown in FIG. 3, the electronic control unit 52 functionally includes an ignition retardation torque reduction control execution unit 108, a throttle torque reduction control start determination unit 110, a torque reduction purpose determination unit 112, a throttle torque reduction control execution unit 114 and a supercharging pressure adjustment control unit 116.

The ignition retardation torque reduction control execution unit 108 executes the ignition retardation torque reduction control during an upshift of the automatic transmission 12. A first engine torque decrease amount DT1e is a decrease amount DT1e of the engine torque Te through the ignition retardation torque reduction control. The first engine torque decrease amount DT1e is, for example, determined within a range that can be achieved through retardation of the ignition timing of the engine 10 on the basis of the engine intake air flow rate Qin, and the like, from an empirically set relationship (map, or the like) such that it is possible to promptly complete the upshift and it is possible to suppress a shock in the inertia phase of the upshift. A relationship between a first engine torque decrease amount DT1e and an ignition timing retardation amount DTig of the engine 10 is empirically obtained in advance. The ignition timing retardation amount DTig of the engine 10 in the ignition retardation torque reduction control is determined on the basis of the first engine torque decrease amount DT1e in accordance with the relationship empirically obtained in advance, for example, before a start of the inertia phase of the upshift.

The throttle torque reduction control start determination unit 110 sequentially determines whether a condition for starting the throttle torque reduction control, that is, a throttle torque reduction control start condition, is satisfied. The throttle torque reduction control start condition can include various contents, and is, for example, configured to include a first start condition and a second start condition. The throttle torque reduction control start condition is satisfied when the first start condition or the second start condition is satisfied. The first start condition is configured to include a condition (1-1) that the accelerator operation amount PAP is larger than or equal to a predetermined value PAPx, that is, the accelerator is on, a condition (1-2) that it is the time of an upshift of the automatic transmission 12 and a condition (1-3) that it is the time of a start of the inertia phase of the upshift. The first start condition is satisfied when all the conditions (1-1) to (1-3) are fulfilled. In short, the first start condition is satisfied at the time of a start of the inertia phase at the time of a power-on upshift that is an upshift at the time when the accelerator is on (an acceleration request is being issued). More specifically, the first start condition is satisfied after shift determination is made to start the upshift and before a start of the inertia phase. The predetermined value PAPx for the accelerator operation amount PAP is empirically set in advance such that, for example, the first start condition is satisfied when the amount of decrease in the engine torque Te during a power-on upshift is not enough through only execution of the ignition retardation torque reduction control.

The second start condition is configured to include a condition (2-1) that it is the time when the vehicle 6 is stuck and a condition (2-2) that a target engine torque Tet that is determined in correspondence with the accelerator operation amount PAP is larger than or equal to a predetermined value. The second start condition is satisfied when all the conditions (2-1), (2-2) are fulfilled. The time when the vehicle 6 is stuck is the case where, although the vehicle 6 is stopped, accelerating operation is conducted by the driver, for example, a shift is set at a drive range and the accelerator pedal 88 is depressed, and the engine 10 is driven. Whether it is the time when the vehicle 6 is stuck is determined on the basis of, for example, a shift lever position, the throttle opening degree θth, the wheel speed Nwh, and the like. The condition (2-2) may be simply set as a condition that the accelerator operation amount PAP is larger than or equal to the predetermined value.

When the throttle torque reduction control start determination unit 110 has determined that the throttle torque reduction control start condition is satisfied, the torque reduction purpose determination unit 112 determines the purpose of the throttle torque reduction control that is executed as a result of fulfillment of the throttle torque reduction control start condition. Specifically, the first start condition is preset in order to execute the throttle torque reduction control for the purpose of temporary torque reduction during a shift of the automatic transmission 12, so the torque reduction purpose determination unit 112 determines that the purpose of executing the throttle torque reduction control is a temporary torque reduction during a shift when the throttle torque reduction control start condition is satisfied as a result of fulfillment of the first start condition. On the other hand, the second start condition is preset in order to execute the throttle torque reduction control for the purpose of protecting components that constitute the power transmission path from the engine 10 to the drive wheels 38, that is, for example, bearings and the clutches, brakes, and the like, of the automatic transmission 12, against an overload, so the torque reduction purpose determination unit 112 determines that the purpose of executing the throttle torque reduction control is a torque reduction for protecting the components when the throttle torque reduction control start condition is satisfied as a result of fulfillment of the second start condition. When both the first start condition and the second start condition are satisfied, the torque reduction purpose determination unit 112 regards that only the second start condition is satisfied, and determines that the purpose of executing the throttle torque reduction control is a torque reduction for protecting the components.

When the throttle torque reduction control start determination unit 110 has determined that the throttle torque reduction control start condition is satisfied, the throttle torque reduction control execution unit 114 determines a second engine torque decrease amount DT2e, which is a decrease amount DT2e of the engine torque Te through the throttle torque reduction control, on the basis of, for example, the engine rotation speed Ne and the transmission input torque Tatin before a start of the throttle torque reduction control by consulting a torque reduction map empirically set in advance. For example, when the throttle torque reduction control start condition is satisfied as a result of unfulfillment of the second start condition and fulfillment of the first start condition, a map empirically set in advance such that it is possible to promptly complete the upshift of the automatic transmission 12 and it is possible to suppress a shock in the inertia phase of the upshift is used as the torque reduction map for determining the second engine torque decrease amount DT2e. On the other hand, when the throttle torque reduction control start condition is satisfied as a result of fulfillment of the second start condition resulting from fulfillment of both the first start condition and the second start condition, a map empirically set in advance such that it is possible to protect the components is used as the torque reduction map. When the throttle torque reduction control execution unit 114 determines the second engine torque decrease amount DT2e, the throttle torque reduction control execution unit 114 determines a reduction amount D$\theta$th of the throttle opening degree $\theta$th, that is, a throttle reduction amount D$\theta$th, corresponding to the second engine torque decrease amount DT2e, on the basis of the second engine torque decrease amount DT2e from a relationship empirically obtained in advance. When the throttle torque reduction control execution unit 114 determines the throttle reduction amount D$\theta$th, the throttle torque reduction control execution unit 114 executes the throttle torque reduction control with the determined throttle reduction amount D$\theta$th. Specifically, the throttle torque reduction control is executed by reducing the throttle opening degree $\theta$th with the throttle reduction amount D$\theta$th with respect to the throttle opening degree $\theta$th before a start of the throttle torque reduction, control. More specifically, when the throttle torque reduction control start condition is satisfied as a result of unfulfillment of the second start condition and fulfillment of the first start condition, the throttle torque reduction control is executed by reducing the throttle opening degree $\theta$th by the throttle reduction amount D$\theta$th temporarily during the inertia phase of the upshift of the automatic transmission 12. In addition, when the throttle torque reduction control start condition is satisfied as a result of fulfillment of the second start condition resulting from fulfillment of both the first start condition and the second start condition, the throttle torque reduction control is executed for protecting the components by immediately reducing the throttle opening degree $\theta$th by the throttle reduction amount D$\theta$th.

When the throttle torque reduction control execution unit 114 has started the throttle torque reduction control, the throttle torque reduction control execution unit 114 ends the throttle torque reduction control where appropriate. For example, when the throttle torque reduction control start condition is satisfied as a result of unfulfillment of the second start condition and fulfillment of the first start condition and, therefore, the throttle torque reduction control execution unit 114 has started the throttle torque reduction control, the throttle torque reduction control execution unit 114 ends the throttle torque reduction control before an end of the inertia phase of the upshift (end of shift) at the latest. That is, the throttle torque reduction control execution unit 114 stops the temporary reduction of the throttle opening degree $\theta$th. In addition, when the throttle torque reduction control start condition is satisfied as a result of fulfillment of the second start condition resulting from fulfillment of both the first start condition and the second start condition and, therefore, the throttle torque reduction control execution unit 114 has started the throttle torque reduction control, the throttle torque reduction control execution unit 114 ends the throttle torque reduction control at the time of a change from fulfillment of the second start condition to unfulfillment of the second start condition.

When the torque reduction purpose determination unit 112 has determined that the purpose of executing the throttle torque reduction control is a temporary torque reduction during a shift of the automatic transmission 12 and the throttle torque reduction control execution unit 114 executes the throttle torque reduction control, the supercharging pressure adjustment control unit 116 executes supercharging pressure keeping control, for suppressing a decrease in the supercharging pressure Pcm temporally in parallel with the throttle torque reduction control. This is because, if the supercharging pressure keeping control is not executed, the supercharging pressure Pcm decreases with a reduction in the throttle opening degree $\theta$th through the throttle torque reduction control and, as a result, the engine torque Te becomes insufficient after an end of an upshift of the automatic transmission 12. In contrast, when the torque reduction purpose determination unit 112 has determined that the purpose of executing the throttle torque reduction control is a torque reduction for protecting the components, the supercharging pressure adjustment control unit 116 does not execute the supercharging pressure keeping control, and, temporally in parallel with the throttle torque reduction control, actuates the waste gate valve 68 in a direction in which the supercharging pressure Pcm is decreased (i.e., such that the supercharging pressure Pcm is decreased), that is, a direction in which the waste gate valve opening degree $\theta$wg is increased (i.e., such that the waste gate valve opening degree $\theta$wg is increased), with respect to the waste gate valve opening degree $\theta$wg before a start of the throttle torque reduction control. Here, the supercharging pressure keeping control is specifically control for temporarily actuating the waste gate valve 68 in a direction in which a decrease in the supercharging pressure Pcm is suppressed with respect to a position of the waste gate valve 68 before a start of the control, that is, before a start of the upshift, during the upshift of the automatic transmission 12, in other words, control for temporarily actuating the waste gate valve 68 in a direction in which the amount of exhaust gas for driving the supercharger 54 for rotation is increased (i.e., such that the amount of exhaust gas is increased), that is, a direction in which the waste gate valve opening degree $\theta$wg is reduced (i.e., such that the opening degree $\theta$wg is reduced). In executing the supercharging pressure keeping control, the supercharging pressure adjustment control unit 116, for example, starts the supercharging pressure keeping control at the time when a decrease in the supercharging pressure Pcm has been detected after a start of the inertia phase of the upshift of the automatic transmission 12, and ends the supercharging pressure keeping control at an end of the inertia phase or before an end of the inertia phase. An actuation amount of the waste gate valve 68 in the supercharging pressure keeping control, that is, the reduction amount D$\theta$wg of the waste gate valve opening degree $\theta$wg with respect to the waste gate valve opening degree $\theta$wg before a start of the supercharging pressure keeping control, is, for example, set before a start of the inertia phase on the basis of the throttle reduction amount D$\theta$th, and the like, in the throttle torque reduction control by consulting a relationship empirically set in advance such that the supercharging pressure Pcm does not decrease and is kept at or above the supercharging pressure Pcm before a start of the supercharging pressure keeping control even when the throttle torque reduction control is executed, for example, a relationship empirically set in advance such that the supercharging pressure Pcm is kept at or above a target value of the supercharging pressure Pcm before a start of the supercharging pressure keeping control. Alternatively, the reduction amount Dθwg of the waste gate valve opening degree θwg may be a preset amount, or the waste gate valve 68 may be fully closed.

In this way, the ignition retardation torque reduction control is executed during an upshift of the automatic transmission 12, and when the first start condition is further satisfied, the throttle torque reduction control is also executed additionally, and the supercharging pressure keeping control is also executed. That is, the proportion of the second engine torque decrease amount DT2e within a total engine torque decrease amount DTetotal, which is a total decrease amount of the first engine torque decrease amount DT1e and the second engine torque decrease amount DT2e, is larger when the throttle torque reduction control is executed than when the throttle torque reduction control is not executed. Therefore, the electronic control unit 52, specifically, the supercharging pressure adjustment control unit 116 included in the electronic control unit 52, increases the actuation amount of the waste gate valve 68 in a direction in which a decrease in the supercharging pressure Pcm is suppressed by executing the supercharging pressure keeping control with an increase in the proportion of a decrease amount of the transmission input torque Tatin through the throttle torque reduction control (corresponding to the second engine torque decrease amount DT2e) to a total decrease amount of the transmission input torque Tatin through the ignition retardation torque reduction control and the throttle torque reduction control (corresponding to the total engine torque decrease amount DTetotal). That is, the reduction amount Dθwg of the waste gate valve opening degree θwg is increased.

Figure 4:
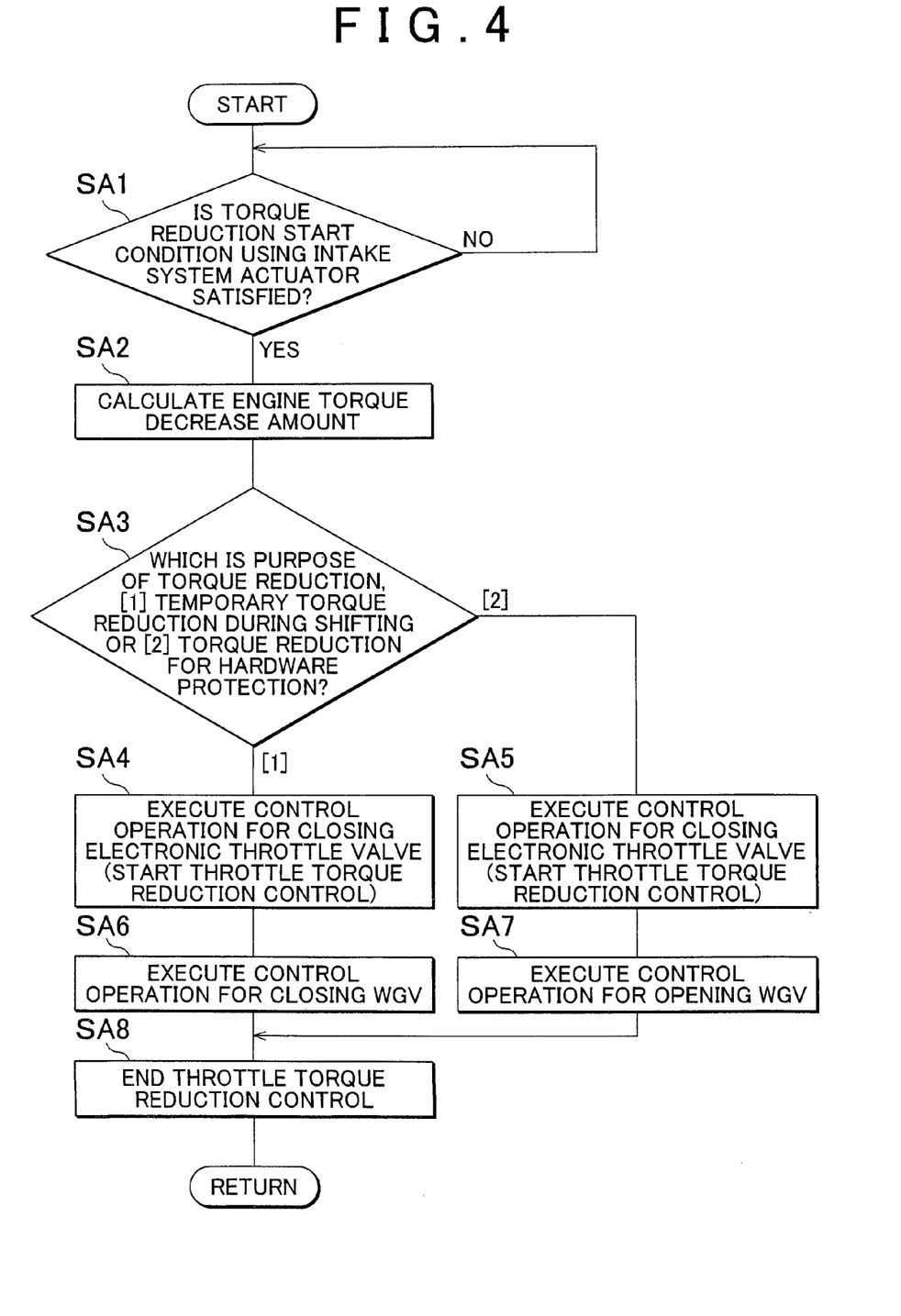
FIG. 4 is a flowchart for illustrating a relevant portion of a control operation of the electronic control unit shown in FIG. 3, that is, a control operation for opening or closing a waste gate valve together with throttle torque reduction control.

FIG. 4 is a relevant portion of a control operation of the electronic control unit 52, that is, a flowchart for illustrating a control operation for opening or closing the waste gate valve 68 together with the throttle torque reduction control. The flowchart is repeatedly executed. The control operation shown in FIG. 4 is executed solely or in parallel with another control operation.

Initially, in step (hereinafter, "step" is omitted) SA1, it is determined whether the throttle torque reduction control start condition is satisfied. The throttle torque reduction control is configured to decrease the engine torque Te by closing the electronic throttle valve 72 that is an intake system actuator, so the throttle torque reduction control start condition is a torque reduction start condition using the intake system actuator. When affirmative determination is made in SA1, that is, when the throttle torque reduction control start condition is satisfied, the process proceeds to SA2. On the other hand, when negative determination is made in SA1, SA1 is repeated. SA1 corresponds to the throttle torque reduction control start determination unit 110.

In SA2, the second engine torque decrease amount DT2e is calculated and determined. Then, the throttle reduction amount Dθth corresponding to the second engine torque decrease amount DT2e is calculated and determined. Subsequent to SA2, the process proceeds to SA3.

In SA3 corresponding to the torque reduction purpose determination unit 112, the purpose of the throttle torque reduction control that is executed in SA4 or SA5 (described later) is determined. Specifically, when fulfillment of the throttle torque reduction control start condition, determined in SA1, is due to fulfillment of the first start condition, it is determined that the purpose of executing the throttle torque reduction control is a temporary torque reduction during the shift. On the other hand, when fulfillment of the throttle torque reduction control start condition is due to fulfillment of the second start condition, it is determined that the purpose of executing the throttle torque reduction control is a torque reduction for protecting the components (hardware protection). In addition, when both the first start condition and the second start condition are satisfied, it is not determined that the purpose of executing the throttle torque reduction control is a temporary torque reduction during the shift, but it is determined that the purpose of executing the throttle torque reduction control is a torque reduction for protecting the components. When it is determined in SA3 that the purpose of executing the throttle torque reduction control is a temporary torque reduction during the shift, the process proceeds to SA4. On the other hand, when it is determined that the purpose is a torque reduction for protecting the components, the process proceeds to SA5.

In SA4, the throttle torque reduction control is started with the throttle reduction amount Dθth determined in SA2. That is, torque reduction control over the engine 10 for actuating the electronic throttle valve 72 in a closing direction by the throttle reduction amount Dθth with respect to throttle reduction amount Dθth before a start of control is started. Subsequent to SA4, the process proceeds to SA6.

In SA5, as in the case of SA4, the throttle torque reduction control is started at the throttle reduction amount Dθth determined in SA2. Subsequent, to SA5, the process proceeds to SA7. SA2, SA4 and SA5 correspond to the throttle torque reduction control execution unit 114.

In SA6, the supercharging pressure keeping control is executed. That is, in the supercharging pressure keeping control, the waste gate valve 68 is temporarily actuated in a closing direction. Subsequent to SA6, the process proceeds to SA8. "WGV" shown in FIG. 4 is an abbreviation of the waste gate valve.

In SA7, the supercharging pressure keeping control is not executed, and the waste gate valve 68 is actuated in an opening direction with respect to a position of the waste gate valve 68 before a start of the throttle torque down control temporally in parallel with the throttle torque reduction control. For example, the waste gate valve 68 may be fully opened, and the actuation amount for opening the waste gate valve 68 may be determined on the basis of the throttle reduction amount Dθth determined in SA2. SA6 and SA7 correspond to the supercharging pressure adjustment control unit 116.

In SA8 corresponding to the throttle torque reduction control execution unit 114 and the supercharging pressure adjustment control unit 116, the throttle torque reduction control started in SA4 or SA5 and the control for actuating the waste gate valve 68, started in SA6 or SA7, each are ended in accordance with a predetermined condition.

Figure 5:
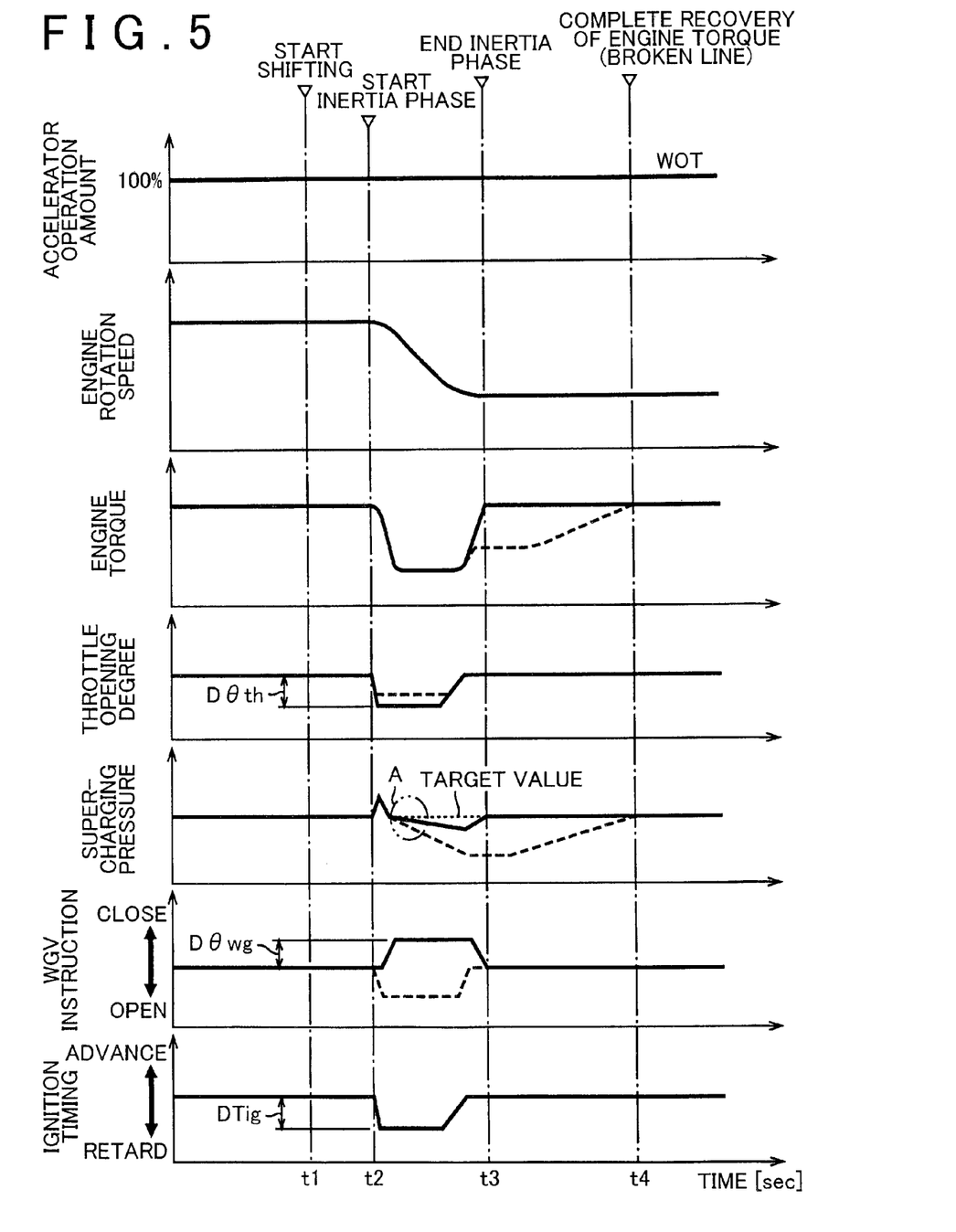
FIG. 5 is a time chart at the time when supercharging pressure keeping control is executed at the time of a power-on upshift of the automatic transmission shown in FIG. 1 from the first speed to the second speed.

FIG. 5 is a time chart at the time when the supercharging pressure keeping control is executed at the time of a power-on upshift from the first speed to the second speed in the automatic transmission 12. In FIG. 5, the time chart at the time when the supercharging pressure keeping control is executed is indicated by the solid line, and the time chart of the related art in which the supercharging pressure keeping control is not executed is indicated by the broken line. FIG. 5 illustrates the power-on upshift, so, in FIG. 5, the accelerator operation amount PAP is constantly kept at, for example, the maximum opening degree (=100%). The time point t1 in FIG. 5 is the time point at which an upshift from the first speed to the second speed has been started, for example, actuation start time point of the engagement device (clutch or brake) that is operated in the upshift. The time point t2 is the start time point of the inertia phase of the upshift, and the time point t3 is the end time point of the inertia phase. Thus, the engine rotation speed Ne decreases with a lapse of time between the time point t2 to the time point t3. The time point t4 indicates the time point at which recovery of the engine torque Te has been completed when the supercharging pressure keeping control is not executed, specifically, when the waste gate valve (WGV) 68 is actuated as indicated by the broken line. The time chart of the WGV instruction in FIG. 5 is a time chart of the command signal for opening or closing the waste gate valve 68, corresponds to the waste gate valve opening degree θwg, and indicates that the waste gate valve opening degree θwg reduces, that is, the waste gate valve 68 is more closed, as it goes upward in the chart.

The time chart indicated by the solid line in FIG. 5 will be described first. In FIG. 5, between the time point t1 and the time point t2, affirmative determination is made in SA1 of FIG. 4 as a result of fulfillment of the first start condition, the throttle reduction amount Dθth is determined in SA2 of FIG. 4, and it is determined in SA3 of FIG. 4 that the purpose of executing the throttle torque reduction control is a temporary torque reduction during the shift. Then, the throttle torque reduction control is started from the time point t2, and is ended before the inertia phase end time point, that is, the time point t3 that is the shift end time point. Therefore, through the throttle torque reduction control, the throttle opening degree θth is temporarily reduced by the throttle reduction amount Dθth as compared to the throttle opening degree θth before the time point t2 between the time point t2 and the time point t3. Then, due to the temporary reduction in the throttle opening degree θth, the engine torque Te is also temporarily decreased between the time point t2 and the time point t3. At this time, as shown in the time chart of the WGV instruction, the supercharging pressure keeping control is executed between the time point t2 and the time point t3, and the waste gate valve opening degree θwg is reduced as compared to the waste gate valve opening degree θwg before the time point t2. For example, the reduction amount Dθwg of the waste gate valve opening degree θwg is increased as the throttle reduction amount Dθth increases. As a result of execution of the supercharging pressure keeping control in parallel with the throttle torque reduction control as indicated by the solid line, a temporary reduction in the throttle opening degree θth in the throttle torque reduction control functions to decrease energy of engine exhaust gas and decrease the supercharging pressure Pcm, but the supercharging pressure keeping control suppresses a decrease in the supercharging pressure Pcm. Therefore, after the temporary reduction in the throttle opening degree θth is stopped immediately before the time point t3, the engine torque Te recovers responsively, and, in FIG. 5, recovery of the engine torque Te completes at the time point t3 as indicated by the solid line. In FIG. 5, through execution of the throttle torque reduction control, the supercharging pressure Pcm instantaneously rises immediately after the time point t2, becomes lower than the target value of the supercharging pressure Pcm and gradually decreases (see portion A), and the supercharging pressure keeping control is started as a result of detecting a decrease in the supercharging pressure Pcm, that is, the fact that the supercharging pressure Pcm becomes lower than the target value. In addition, the ignition retardation torque reduction control is executed between the time point t2 and the time point t3, that is, within the inertia phase of the upshift, so the ignition timing of the engine 10 is retarded by the ignition timing retardation amount DTig with respect to the ignition timing before the time point t2.

Next, the difference of the time chart indicated by the broken line from the time chart indicated by the solid line in FIG. 5 will be mainly described. The time chart indicated by the broken line shows the related art. In the time chart indicated by the broken line in FIG. 5, the throttle reduction amount Dθth for reducing the throttle opening degree θth through execution of the throttle torque reduction control is reduced as compared to the time chart of the throttle opening degree θth indicated by the solid line. Then, the waste gate valve opening degree θwg is temporarily increased as compared to the waste gate valve opening degree θwg before the time point t2 between the time point t2 and the time point t3. Therefore, after the time point t2, the supercharging pressure Pcm indicated by the broken line is lower as compared to the time chart of the solid line, and, although, before the time point t3, the waste gate valve opening degree θwg is recovered to the opening degree before the time point t2, the supercharging pressure Pcm still remains lower than the solid line after the time point t3, and recovery of the supercharging pressure Pcm has completed at the time point t4. Thus, the engine torque Te (broken line) decreased through the throttle torque reduction control is not recovered at the time point t3, and recovery has been completed at the time point t4.

As is apparent from the mutual comparison between the solid-line time chart and the broken-line time chart in FIG. 5 described above, a delay of recovery of the engine torque Te after an end of the throttle torque reduction control is suppressed through execution of the supercharging pressure keeping control.

As described above, according to the present embodiment, the electronic control unit 52 executes the throttle torque reduction control for decreasing the engine torque Te by reducing the throttle opening degree θth during an upshift of the automatic transmission 12 as compared to the throttle opening degree θth before a start of the upshift. Then, during an upshift of the automatic transmission 12, together with execution of the throttle torque reduction control, the waste gate valve 68 is actuated in a direction in which a decrease in the supercharging pressure Pcm (=closing direction) is suppressed with respect to a position of the waste gate valve 68 before a start of the upshift. Thus, when the throttle opening degree θth is reduced in the throttle torque reduction control, the supercharging pressure Pcm is decreased; however, the waste gate valve 68 is actuated in a direction in which a decrease in the supercharging pressure Pcm is suppressed in parallel with execution of the throttle torque reduction control, so a decrease in the supercharging pressure Pcm due to execution of the throttle torque reduction control during an upshift of the automatic transmission 12 is suppressed, and the engine torque Te that has been temporarily decreased within the inertia phase of the upshift is recovered immediately after the upshift. Thus, it is possible to suppress deterioration of drivability due to a decrease in the supercharging pressure Pcm at the time of the upshift. For example, FIG. 6A and FIG. 6B show the graphs for illustrating the advantageous effect.

Figure 6A:
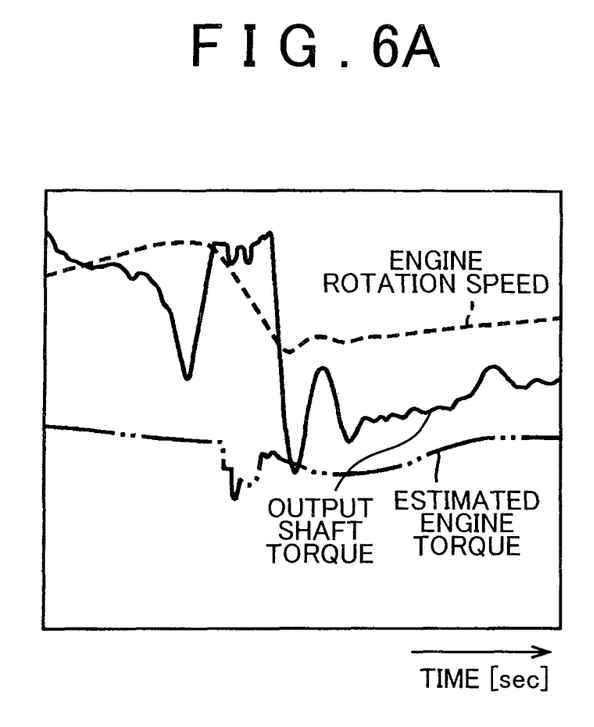
FIG. 6A is a time chart that shows measured results of an output shaft torque and an estimated engine torque at the time of a power-on upshift of the automatic transmission from the first speed to the second speed in a related art in which no supercharging pressure keeping control is executed.
Figure 6B:
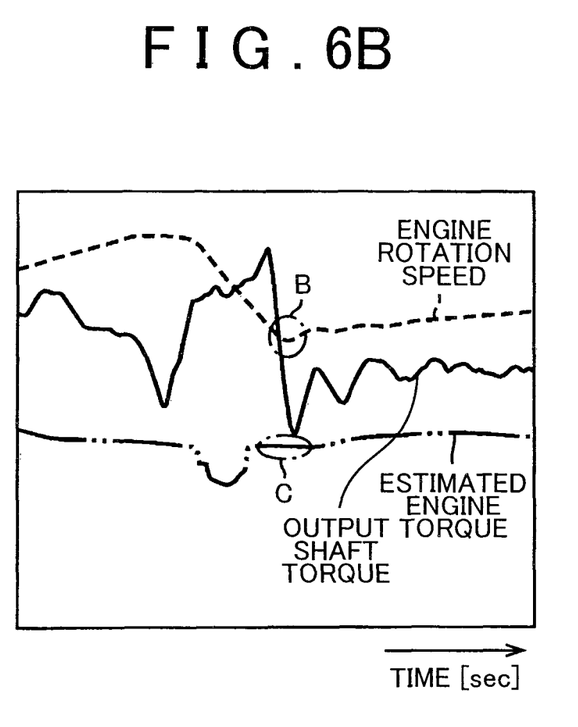
FIG. 6B is a time chart that shows measured results of an output shaft torque and an estimated engine torque at the time of a power-on upshift of the automatic transmission from the first speed to the second speed in the embodiment in which supercharging pressure keeping control is executed.

FIG. 6A shows a time chart that shows measured results of the output shaft torque Tout that is the output torque of the automatic transmission 12, output from the Output gear 28, and an estimated engine torque that is calculated on the basis of the engine rotation speed Ne and the engine intake air flow rate Qin at the time of a power-on upshift from the first speed to the second speed in the automatic transmission 12 in the related art in which the supercharging pressure keeping control is not executed. FIG. 6B shows a time chart that shows measured results of the output shaft torque Tout that is the output torque of the automatic transmission 12, output from the output gear 28, and an estimated engine torque that is calculated on the basis of the engine rotation speed Ne and the engine intake air flow rate Qin at the time of a power-on upshift from the first speed to the second speed in the automatic transmission 12 in the present embodiment in which the supercharging pressure keeping control is executed. For the purpose of easy illustration of the inertia phase of the upshift of the automatic transmission 12, a variation in the engine rotation speed Ne is also shown together. The estimated engine torque is a calculated value, but it may be regarded as an actual engine torque Te. The engine rotation speed Ne stops decreasing at portion B in FIG. 6B, so this stop-decreasing time point is the end of the inertia phase, and the estimated engine torque (see portion C) at the end of the inertia phase appears to be almost not decreasing as compared to the engine torque in FIG. 6A. That is, in the present embodiment, through execution of the supercharging pressure keeping control, the estimated engine torque immediately recovers after the end of the inertia phase (after the end of the upshift). In this way, in the present embodiment, it is possible to immediately recover the estimated torque, that is, the engine torque Te, after the end of the upshift, so it is possible to make it hard for the driver to experience a delay of a rise in driving force after the end of the upshift. In FIG. 6A and FIG. 6B, in order to properly make comparison between FIG. 6A and FIG. 6B, the scales of the ordinate axis and abscissa axis are made equal between FIG. 6A and FIG. 6B.

The throttle torque reduction control is executed during an upshift of the automatic transmission 12, so it is not necessary or it is less necessary to retard the ignition timing of the engine 10 in order to temporarily decrease the engine torque Te, so it is possible to suppress deterioration of drivability as described above, and it is possible to suppress an increase in cost for ensuring the durability of the exhaust turbine wheel 58 of the supercharger 54 against a rise in temperature.

In addition, according to the present embodiment, the electronic control unit 52 increases the actuation amount of the waste gate valve 68 in a direction in which a decrease in the supercharging pressure Pcm is suppressed with an increase in the proportion of a decrease amount of the transmission input torque Tatin through the throttle torque reduction control to a total decrease amount of the transmission input torque Tatin through the ignition retardation torque reduction control and the throttle torque reduction control. Thus, even when the ignition retardation torque reduction control is executed in parallel with the throttle torque reduction control at the time of an upshift of the automatic transmission 12, it is possible to suppress deterioration of drivability due to a decrease in the supercharging pressure Pcm. In addition, the ignition retardation torque reduction control is highly responsive, so it is possible to decrease the transmission input torque Tatin at the effective time point by executing the ignition retardation torque reduction control. For example, it is possible to execute the ignition retardation torque reduction control within a range in which the heat-resistant property of the exhaust turbine wheel 58 of the supercharger 54 is allowed.

According to the present embodiment; the ignition retardation torque reduction control is engine torque control for decreasing the engine torque Te by retarding the ignition timing of the engine 10 with respect to the ignition timing before a start of the ignition retardation torque reduction control. It is possible to execute the ignition retardation torque reduction control with the use of an existing device (ignition device, and the like) of the vehicle 6.

According to the present embodiment, when the torque reduction purpose determination unit 112 has determined that the purpose of executing the throttle torque reduction control is a torque reduction for protecting the components, the supercharging pressure adjustment control unit 116 does not execute the supercharging pressure keeping control. That is, in a vehicle state where accelerating operation (for example, accelerator pedal depression operation) is conducted by the driver and the engine 10 is driven although the vehicle 6 is stopped, the waste gate valve 68 is not actuated in a direction in which a decrease in the supercharging pressure Pcm is suppressed. Thus, when it is required to protect the components that constitute the power transmission path, for example, the clutch C1, and the like, it is possible to avoid actuation of the waste gate valve 68 in a direction in which a load of the components is increased (i.e., such that the load is increased).

According to the present embodiment, the supercharger 54 is an exhaust turbine supercharger that is driven for rotation by exhaust gas of the engine 10 and that generates the supercharging pressure Pcm, and the waste gate valve 68 raises the supercharging pressure Pcm by increasing the amount of exhaust gas for driving the supercharger 54 for rotation within exhaust gas of the engine 10. Then, in the supercharging pressure keeping control, actuating the waste gate valve 68 in a direction in which a decrease in the supercharging pressure Pcm is suppressed is actuating the waste gate valve 68 in a direction in which the amount of exhaust gas for driving the supercharger 54 for rotation is increased (i.e., such that the amount of exhaust gas is increased) as compared to a position of the waste gate valve 68 before a start of the upshift of the automatic transmission 12. Thus, it is possible to sufficiently obtain the advantageous effect that deterioration of drivability due to a decrease in the supercharging pressure Pcm at the time of the upshift is suppressed.

According to the present embodiment, in a vehicle state where accelerating operation is conducted by the driver and the engine 10 is driven although the vehicle 6 is stopped, in short, in a vehicle state where the second start condition included in the throttle torque reduction control start condition is satisfied, the supercharging pressure adjustment control unit 116 actuates the waste gate valve 68 in a direction in which the supercharging pressure Pcm decreases with respect to a position of the waste gate valve 68 before the engine torque Te is decreased through the throttle torque reduction control. That is, the waste gate valve 68 is actuated in an opening direction. Thus, an increase of the engine torque Te is suppressed also by actuating the waste gate valve 68 in the opening direction, with the result that an overload of the components that constitute the power transmission path, for example, an overload of the clutch Cl, and the like, is suppressed, and it is possible to protect the components.

The embodiment of the invention is described in detail with reference to the accompanying drawings; however, the above embodiment is only illustrative. The invention may be modified or improved in various forms on the basis of the knowledge of persons skilled in the art.

For example, in the above-described embodiment, the supercharging pressure adjustment control unit 116 starts the supercharging pressure keeping control at the time when a decrease in the supercharging pressure Pcm has been detected after a start of the inertia phase of the upshift of the automatic transmission 12; instead, the supercharging pressure keeping control may be started at a start of the inertia phase without detecting a decrease in the supercharging pressure Pcm. Alternatively, the supercharging pressure keeping control may be started in synchronization with a start of the throttle torque reduction control.

Figure 7:
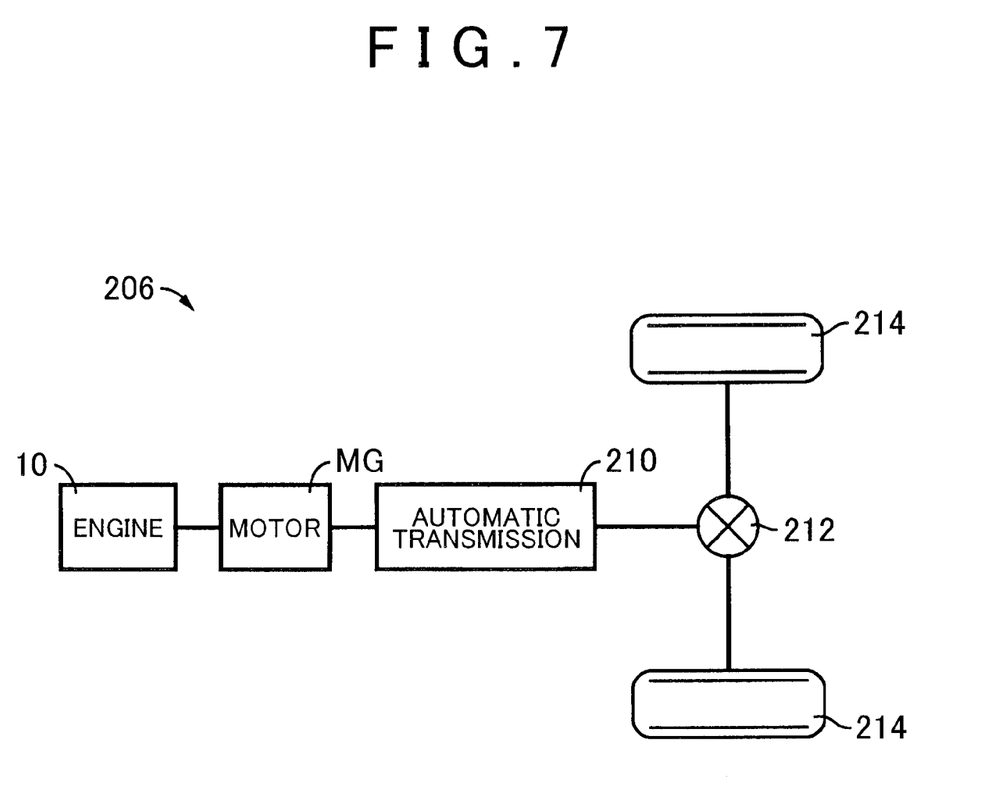
FIG. 7 is a view that shows the schematic configuration of a hybrid vehicle that includes an electric motor in addition to an engine as a driving force source for propelling the vehicle.

In the above-described embodiment, the vehicle 6 does not include an electric motor as a driving force source for propelling the vehicle 6; instead, as shown in FIG. 7, the vehicle may be a hybrid vehicle 206 that includes a drive electric motor MG. In the hybrid vehicle 206 shown in FIG. 7, the engine 10, the electric motor MG, an automatic transmission 210, a differential gear unit 212 and a pair of right and left drive wheels 214, that are serially coupled to each other. In the thus configured hybrid vehicle 206, instead of or in addition to the ignition retardation torque reduction control, torque reduction control for decreasing the transmission input torque Tatin may be executed by causing the electric motor MG, that is coupled to the engine 10, to output a torque (negative torque, regenerative torque) opposite to the engine torque Te. In this case, torque reduction control made by the electric motor MG corresponds to the high-response torque reduction control according to the invention. In FIG. 7, a clutch may be provided between the engine 10 and the electric motor MG.

In the above-described embodiment, the electronic control unit 52 executes the ignition retardation torque reduction control and the throttle torque reduction control; instead, the electronic control unit 52 may not execute the ignition retardation torque reduction control and may execute only the throttle torque reduction control.

In the above-described embodiment, the automatic transmission 12 is a step-gear transmission; instead, the automatic transmission 12 may be, for example, a belt-type continuously variable transmission (CVT).

In the above-described embodiment, the waste gate valve 68 functions as the supercharging pressure adjustment device that adjusts the supercharging pressure Pcm; instead, a mechanism or a device other than the waste gate valve 68 may function as the supercharging pressure adjustment device. For example, it is applicable that the waste gate valve 68 is not provided, a variable nozzle that is able to adjust the flow rate of exhaust gas that is supplied to the exhaust turbine wheel 58 is provided in the exhaust pipe 56 and the variable nozzle functions as the supercharging pressure adjustment device. In such a case, the flow rate of the exhaust gas increases as the variable nozzle is more closed.

In the above-described embodiment, the supercharging pressure Pcm decreases as the waste gate valve opening degree θwg increases; instead, for example, it is applicable that the waste gate valve 68 and the associated components are different from those of, FIG. 1 and the supercharging pressure Pcm rises as the waste gate valve opening degree θwg increases.

In the above-described embodiment, the throttle torque reduction control start condition is configured to include the first start condition and the second start condition; however, it is just an example of the contents of the throttle torque reduction control start condition, and the throttle torque reduction control start condition may have another configuration. For example, the throttle torque reduction control start condition may be configured to not include the second start condition but include only the first start condition. In such a case, the flowchart of FIG. 4 does not include SA3, SA5 and SA7, and, subsequent to SA2, the process proceeds to SA4.

The configurations of the first start condition and the second start condition, described in the above-described embodiment, are only illustrative, and the configurations may be other than the configurations described in the above-described embodiment as long as they fall within the respective ranges of the intended purposes.

In the above-described embodiment, as shown in FIG. 1, the vehicle 6 includes the torque converter 14; however, the torque converter 14 is not indispensable.

In the above-described embodiment, the engine 10 is a gasoline engine; however, the fuel is not limited, to gasoline. The fuel may be ethanol, a mixed fuel of ethanol and gasoline, hydrogen, or the like.

In the above-described embodiment, the engine 10 is not a diesel engine, but does not completely exclude a diesel engine.

What is claimed is:

1. A vehicle driving control system for a vehicle that includes an engine and an automatic transmission, the engine having a supercharger and a supercharging pressure adjustment device that adjusts a supercharging pressure of the supercharger, and the automatic transmission being configured to output power, that is input from the engine, to a drive wheel, the vehicle control system comprising:
   an electronic control unit configured to:
      (i) execute throttle torque reduction control that decreases an engine torque by reducing an opening degree of a throttle valve during an upshift of the automatic transmission with respect to the opening degree of the throttle valve before a start of the upshift,
      (ii) execute the throttle torque reduction control during the upshift of the automatic transmission, and
      (iii) actuate the supercharging pressure adjustment device to suppress a decrease in the supercharging pressure, wherein
   the electronic control unit is configured to execute high-response torque reduction control in parallel with the throttle torque reduction control as control for decreasing a transmission input torque input to the automatic transmission during the upshift of the automatic transmission, the high-response torque reduction control has a higher responsiveness than the throttle torque reduction control, and
   the electronic control unit is configured to increase an actuation amount of the supercharging pressure adjustment device such that the decrease in the supercharging pressure is suppressed, with an increase in a proportion of a decrease amount of the transmission input torque through the throttle torque reduction control to a total decrease amount of the transmission input torque through the throttle torque reduction control and the high-response torque reduction control.

2. The vehicle driving control system according to claim 1, wherein the electronic control unit is configured to execute the high-response torque reduction control that decreases the engine torque by retarding ignition timing of the engine with respect to the ignition timing of the engine before a start of the high-response torque reduction control.

3. The vehicle driving control system according to claim 1, wherein the upshift of the automatic transmission, in which the throttle torque reduction control is executed, is a power-on upshift.

4. A vehicle driving control system according to claim 1, wherein the electronic control unit is configured to execute the high-response torque reduction control that decreases the transmission input torque by causing an electric motor, the electric motor being coupled to the engine, to output a torque opposite to the engine torque.

5. A vehicle driving control system for a vehicle that includes an engine and an automatic transmission, the engine having a supercharger and a supercharging pressure adjustment device that adjusts a supercharging pressure of the supercharger, and the automatic transmission being configured to output power, that is input from the engine, to a drive wheel, the vehicle control system comprising:
   an electronic control unit configured to:
      (i) execute throttle torque reduction control that decreases an engine torque by reducing an opening degree of a throttle valve during an upshift of the automatic transmission with respect to the opening degree of the throttle valve before a start of the upshift, (ii) execute the throttle torque reduction control during the upshift of the automatic transmission, and (iii) actuate the supercharging pressure adjustment device to suppress a decrease in the supercharging pressure, wherein, when accelerating operation is conducted by a driver and the engine is driven although the vehicle is stopped, the electronic control unit is configured to cause the supercharging pressure adjustment device not to be actuated such that the decrease in the supercharging pressure is suppressed.

6. A vehicle driving control system for a vehicle that includes an engine and an automatic transmission, the engine having a supercharger and a supercharging pressure adjustment device that adjusts a supercharging pressure of the supercharger, and the automatic transmission being configured to output power, that is input from the engine, to a drive wheel, the vehicle control system comprising:

an electronic control unit configured to:
(i) execute throttle torque reduction control that decreases an engine torque by reducing an opening degree of a throttle valve during an upshift of the automatic transmission with respect to the opening degree of the throttle valve before a start of the upshift,
(ii) execute the throttle torque reduction control during the upshift of the automatic transmission, and
(iii) actuate the supercharging pressure adjustment device to suppress a decrease in the supercharging pressure, wherein the supercharger is an exhaust turbine supercharger that is driven for rotation by exhaust gas of the engine to generate the supercharging pressure, the supercharging pressure adjustment device is configured to raise the supercharging pressure by increasing an amount of the exhaust gas that drives the supercharger for rotation within the exhaust gas of the engine, and the electronic control unit is configured to actuate the supercharging pressure adjustment device such that the amount of the exhaust gas that drives the supercharger for rotation is increased with respect to the amount of the exhaust gas that drives the supercharger for rotation before the start of the upshift to suppress the decrease in the supercharging pressure.

7. A vehicle driving control system for a vehicle that includes an engine and an automatic transmission, the engine having a supercharger and a supercharging pressure adjustment device that adjusts a supercharging pressure of the supercharger, and the automatic transmission being configured to output power, that is input from the engine, to a drive wheel, the vehicle control system comprising:

an electronic control unit configured to:
(i) execute throttle torque reduction control that decreases an engine torque by reducing an opening degree of a throttle valve during an upshift of the automatic transmission with respect to the opening degree of the throttle valve before a start of the upshift,
(ii) execute the throttle torque reduction control during the upshift of the automatic transmission, and
(iii) actuate the supercharging pressure adjustment device to suppress a decrease in the supercharging pressure, wherein, when accelerating operation is conducted by a driver and the engine is driven although the vehicle is stopped, the electronic control unit is configured to cause the supercharging pressure adjustment device to be actuated such that the supercharging pressure is decreased with respect to the supercharging pressure before the engine torque is decreased.

8. A vehicle driving control method for a vehicle that includes an engine, an automatic transmission and an electronic control unit, the engine having a supercharger and a supercharging pressure adjustment device that adjusts a supercharging pressure of the supercharger, and the automatic transmission being configured to output power, that is input from the engine, to a drive wheel, the vehicle driving control method comprising:

executing, by the electronic control unit, throttle torque reduction control that decreases an engine torque by reducing an opening degree of a throttle valve during an upshift of the automatic transmission with respect to the opening degree of the throttle valve before a start of the upshift, executing, by the electronic control unit, the throttle torque reduction control during the upshift of the automatic transmission, actuating, by the electronic control unit, the supercharging pressure adjustment device to suppress a decrease in the supercharging pressure, executing, by the electronic control unit, high-response torque reduction control in parallel with the throttle torque reduction control as control for decreasing a transmission input torque input to the automatic transmission during the upshift of the automatic transmission, the high-response torque reduction control has a higher responsiveness than the throttle torque reduction control, and executing, by the electronic control unit, an increase of an actuation amount of the supercharging pressure adjustment device such that the decrease in the supercharging pressure is suppressed, with an increase in a proportion of a decrease amount of the transmission input torque through the throttle torque reduction control to a total decrease amount of the transmission input torque through the throttle torque reduction control and the high-response torque reduction control.

* * * * *